US010679288B2

(12) United States Patent
Carroll et al.

(10) Patent No.: US 10,679,288 B2
(45) Date of Patent: *Jun. 9, 2020

(54) SYSTEM AND METHOD FOR CONFIGURING TRADE ORDER PARAMETERS

(71) Applicant: Trading Technologies International, Inc., Chicago, IL (US)

(72) Inventors: Steven J. Carroll, Hoffman Estates, IL (US); Stephen P. Decker, Naperville, IL (US); Bharat Mittal, Schaumburg, IL (US)

(73) Assignee: Trading Technologies International, Inc., Chicago, IL (US)

( * ) Notice: Subject to any disclaimer, the term of this patent is extended or adjusted under 35 U.S.C. 154(b) by 89 days.

This patent is subject to a terminal disclaimer.

(21) Appl. No.: 15/801,038

(22) Filed: Nov. 1, 2017

(65) Prior Publication Data

US 2018/0068388 A1 Mar. 8, 2018

Related U.S. Application Data

(63) Continuation of application No. 12/828,066, filed on Jun. 30, 2010, now Pat. No. 9,836,788.

(51) Int. Cl.
*G06Q 40/00* (2012.01)
*G06Q 40/04* (2012.01)

(52) U.S. Cl.
CPC .......... *G06Q 40/04* (2013.01); *G06Q 40/00* (2013.01)

(58) Field of Classification Search
None
See application file for complete search history.

(56) References Cited

U.S. PATENT DOCUMENTS 6,651,217 B1   11/2003   Kennedy et al.
7,315,840 B1    1/2008   Keith
                         (Continued)

FOREIGN PATENT DOCUMENTS

JP    H08-263558 A    10/1996
JP    2004535007 A    11/2004
                      (Continued)

OTHER PUBLICATIONS

International Search Report and Written Opinion of the International Search Authority for PCT App. No. PCT/US11/40478, dated Sep. 16, 2011.

*Primary Examiner* — Scott S Trotter
(74) *Attorney, Agent, or Firm* — McDonnell Boehnen Hulbert & Berghoff LLP

(57) ABSTRACT

The example methods and systems described herein provide for configuration of one or more trade order parameters to associate with one or more trade orders, where the trade orders may be submitted to one or more electronic exchanges. According to an example embodiment, rather than having the trader manually configure each individual parameter associated with each trade order, a trader can pre-configure customer and order parameters. A user, for example a trader, broker, or market maker, can configure trade order parameters to associate with one or more customers, one or more order types, and/or internal messages to associate with any of the configured customers or orders. Based on the selected customer and tradeable object, the trading system evaluates the pre-configured customer and associated order parameters and determines which trade order parameters best match. The trading system then dynamically populates the order entry window with the specific trade order parameters associated with the best match.

7 Claims, 10 Drawing Sheets

(56) References Cited

U.S. PATENT DOCUMENTS

| | | |
|---|---|---|
| 7,668,767 B1 | 2/2010 | Borsand |
| 7,689,500 B2 | 3/2010 | Cottrell |
| 7,805,355 B2 | 9/2010 | Wigzell |
| 8,027,945 B1 | 9/2011 | Elad et al. |
| 2002/0026399 A1 | 2/2002 | Narayan et al. |
| 2002/0091606 A1 | 7/2002 | Shapiro |
| 2003/0236737 A1 | 12/2003 | Kemp, II et al. |
| 2005/0160021 A1 | 7/2005 | Nesmith et al. |
| 2005/0257148 A1 | 11/2005 | Goodman et al. |
| 2006/0010066 A1 | 1/2006 | Rosenthal et al. |
| 2006/0047590 A1 | 3/2006 | Anderson et al. |
| 2006/0229959 A1 | 10/2006 | Heidingsfeld et al. |
| 2007/0299785 A1 | 12/2007 | Tulberg et al. |
| 2008/0091586 A1 | 4/2008 | Cottrell |
| 2008/0183639 A1 | 7/2008 | Disalvo |
| 2009/0070250 A1 | 3/2009 | Adcock |
| 2009/0094154 A1 | 4/2009 | Del Callar et al. |
| 2010/0332367 A1 | 12/2010 | Foygel et al. |
| 2011/0040668 A1 | 2/2011 | Lee et al. |
| 2011/0040669 A1 | 2/2011 | Lee et al. |
| 2012/0005060 A1 | 1/2012 | Carroll et al. |

FOREIGN PATENT DOCUMENTS

| | | |
|---|---|---|
| JP | 2009026253 A | 2/2009 |
| JP | 2009199485 A | 9/2009 |
| WO | 2002103601 A1 | 12/2002 |

Customer Defaults

| | Customer | Product Gateway | Market | Product Type | Account # | Acct Type | Give Up | FFT2 | FFT3 | User Tag | Order Template |
|---|---|---|---|---|---|---|---|---|---|---|---|
| 1 | <Default> | * | * | * | | | | | | | |
| 2 | TRADER1 | * | * | * | abcd | A1 | | | | | ICEBERG |
| 3 | TRADER1 | * | CME | * | 1234 | A1 | | | | | STOP LIMIT |
| 4 | TRADER2 | * | * | * | efgh | A1 | | | | | ICEBERG |
| 5 | TRADER2 | * | CME | * | 5678 | A1 | | | | | STOP LIMIT |
| 6 | | | | | | | | | | | |

FIG. 3

| Order Defaults | | | | | PRODUCT | | | PRICE | | | | TRIGGER | | | | SLICER | | |
|---|---|---|---|---|---|---|---|---|---|---|---|---|---|---|---|---|---|---|
| | Template | Prod | Gateway | Market | Prod. Type | Price Mode | Price Mode Type | Price Mode Ticks | Modifier | TPrice Type | TPrice Qty | Qualifier | Ticks Away | Adv. | Disc Qty | Order Tag |
| 1 | <Default> | * | * | * | * | | | | <none> | | | | | <none> | | |
| 2 | STOP LIMIT | * | * | * | * | Rel. | Trigger | 5 | Stop | LTP | 1 | >= | | <none> | | |
| 3 | STOP LIMIT | * | * | CBOT | * | Rel. | Trigger | 5 | Stop | Bid | 2 | >= | | <none> | | |
| 4 | ICEBERG | * | * | * | * | Fixed | | | <none> | | | | | Iceberg | 1 | |
| 5 | ICEBERG | * | * | CBOT | * | Fixed | | | <none> | | | | | Iceberg | 2 | |
| 6 | | | | | | | | | | | | | | | | |

FIG. 4

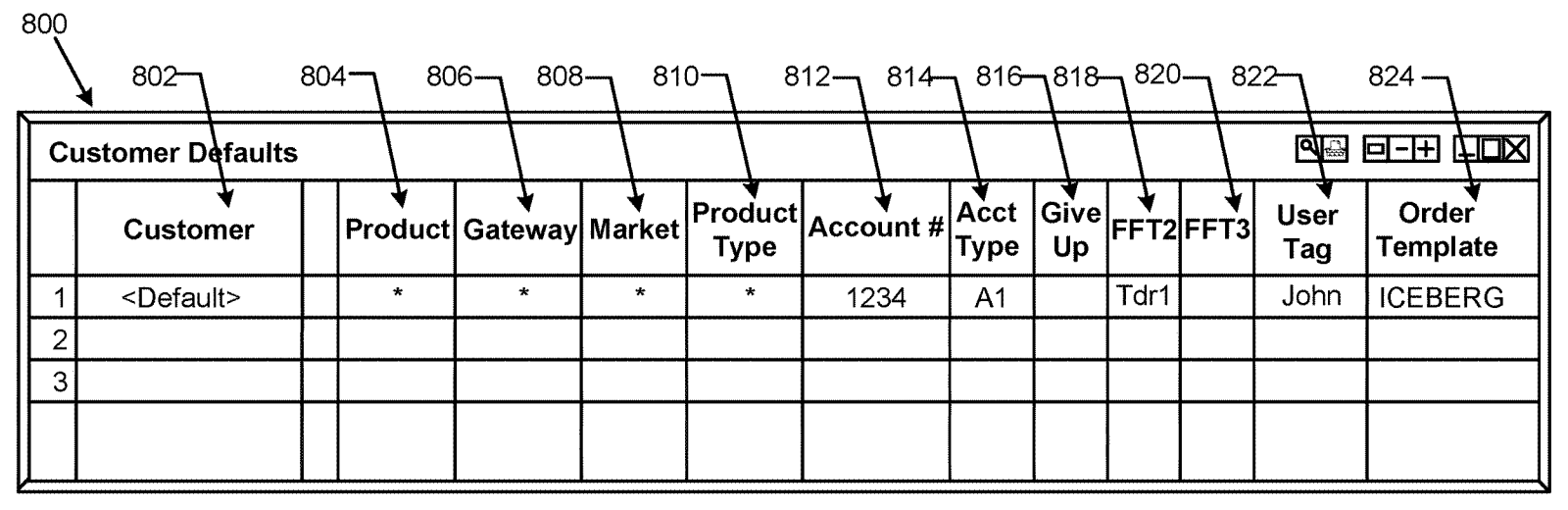

Customer Defaults

| | Customer | Product | Gateway | Market | Product Type | Account # | Acct Type | Give Up | FFT2 | FFT3 | User Tag | Order Template |
|---|---|---|---|---|---|---|---|---|---|---|---|---|
| 1 | <Default> | * | * | * | * | 1234 | A1 | | Tdr1 | | John | ICEBERG |
| 2 | | | | | | | | | | | | |
| 3 | | | | | | | | | | | | |

FIG. 8

SYSTEM AND METHOD FOR CONFIGURING TRADE ORDER PARAMETERS

CROSS-REFERENCE TO RELATED APPLICATIONS

This application is a continuation of U.S. patent application Ser. No. 12/828,066, filed Jun. 30, 2010, now U.S Pat. No. 9,836,788, the contents of which are fully incorporated herein by reference for all purposes.

TECHNICAL FIELD

The disclosure of this patent document relates generally to the field of electronic trading, and more particularly, to computer program-implemented method for configuring trade order parameters.

BACKGROUND

An electronic trading system includes an electronic matching system for tradeable items, such as stocks, options, and commodities. The electronic trading system often includes an electronic exchange to perform order matching. The electronic exchange also provides, among other things, market data and trade confirmation data to subscribing trading devices. By way of illustration, an electronic exchange in derivatives trading is the CME® Globex® electronic trading platform, which is offered by the Chicago Mercantile Exchange Group; though the inventions described herein are not limited to derivatives trading.

To trade in an electronic trading system, a person (commonly a trader) uses a trading device to receive and electronically process data from the electronic exchange. The trading device generally outputs the data to the person via one or more display screens. The person may also interact with the computer and the data using an input device, such as a mouse or keyboard or both. For example, the person may place trade orders, modify trade orders, and delete trade orders at the electronic exchange using the trading device. Depending on how a trading device is configured, trading with it may require a great deal of the person's attention (e.g., as in manual style trading), require very little or no attention (e.g., as in automated style trading), or somewhere in between.

It is well known that prior to submitting a trade order to an electronic exchange, a trader manually configures one or more order parameters to associate with the trade order. For example, a trader may configure trade order parameters such as, price and quantity, to associate with each trader order. It is also well known that a trader may subscribe to multiple electronic exchanges and submit a variety of specific trade orders or trading strategies to each of those exchanges. Each of the specific trade orders can be configured with different trade order parameters, giving the trader increased options for how to react to current market conditions and events. However, with so many options for configurability, it can be very difficult, time consuming, and error prone for a trader to configure and manage the many different trade order types, trader order parameters, when to submit each type of order, and how to maximize profitability.

As such, there is a need for a trader to more accurately and quickly configure trade order parameters to associate with a trade order.

SUMMARY

There are a number of embodiments of the various present inventions described herein. Certain embodiments of the present inventions are directed towards configuring trade order parameters associated with a variety of trade orders.

The example methods and systems described herein provide for configuration of one or more trade order parameters to associate with one or more trade orders, where the trade orders may be submitted to one or more electronic exchanges. According to an example embodiment, rather than having the trader manually configure each individual parameter associated with each trade order, a trader can pre-configure customer and order parameters. A user, for example a trader, broker, or market maker, can configure trade order parameters to associate with one or more customers, one or more order types, and/or internal messages to associate with any of the configured customers or orders. Once a user has configured trade order parameters, the parameters may be stored in memory, for example, in a database. It should be understood that the parameter information may be stored elsewhere.

According to an example embodiment, a trader selects a combination of a customer and a tradeable object. Based on the selected customer and tradeable object, the trading system evaluates the pre-configured customer and associated order parameters and determines which trade order parameters best match. The trading system then dynamically populates the order entry window with the specific trade order parameters associated with the best match.

Determining which trade order parameters best match the selected customer and tradeable object may be based on a weight and precedence that are defined for one or more parameter, where the parameter with the highest precedence is given the highest weight. Matching goes in order of precedence, for example, customer name, tradeable object (or product), gateway, market, and product type.

In yet another example, at least one embodiment provides a method for configuring internal messaging such as, free form text, user tags, and order tags to provide further trade order details to electronic exchanges and traders. A trader can use this information, for example, for internal sorting or tracking. The internal messages may or may not be sent to the electronic exchange.

Other embodiments, and aspects thereof, of the present inventions are described below. In addition, modifications may be made to the described embodiments without departing from the spirit or scope of the inventions.

BRIEF DESCRIPTION OF THE DRAWINGS

The following disclosure will be better understood by a person skilled in the art when read in conjunction with the figures which show various example embodiments. The figures are for the purpose of illustrating example apparatuses and methods, but it is understood that the various inventions, described herein, are not limited to the arrangements and instrumentality shown in the figures.

FIG. 3 is a diagram that illustrates an example graphical display used to configure customer related parameters.

FIG. 4 is a diagram that illustrates an example graphical display used to configure order related parameters.

FIG. 8 is a diagram that illustrates an example graphical display used to configure customer related parameters.

DETAILED DESCRIPTION

Figure 1:
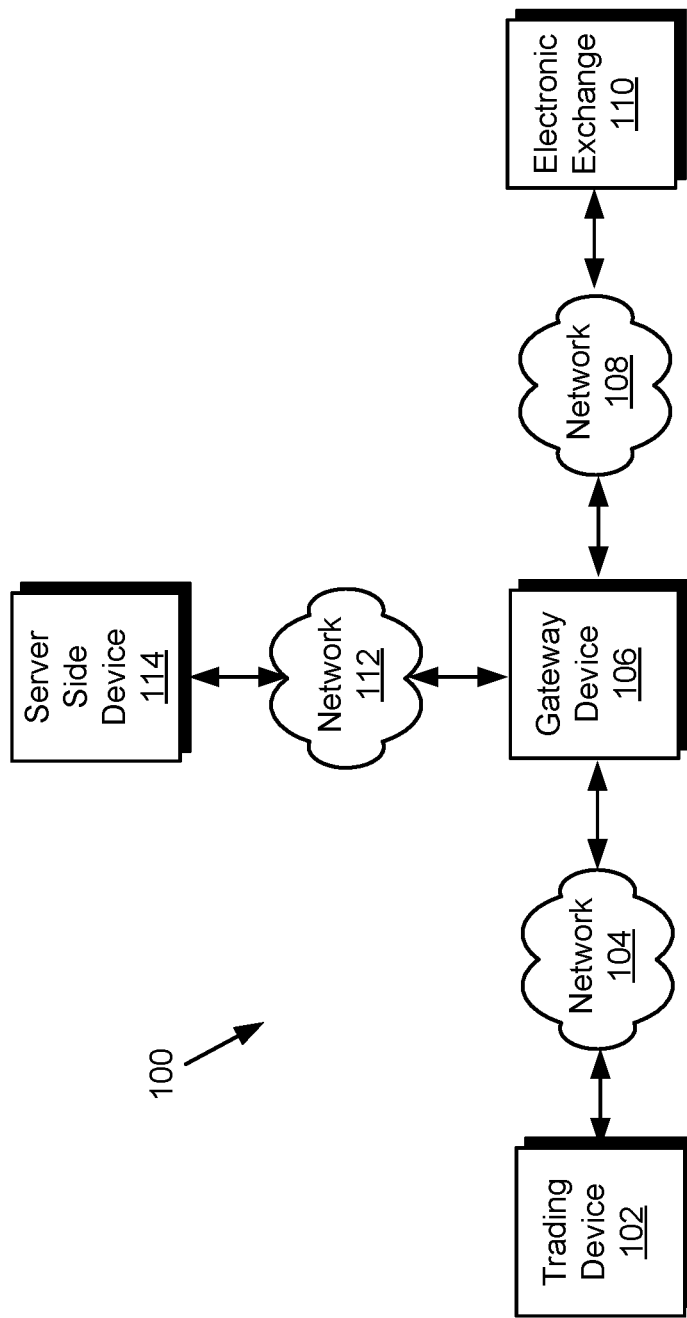
FIG. 1 is a block diagram that illustrates an example electronic trading system upon which one or more embodiments may be implemented.

There are a number of inventions described herein that generally relate to a system and method of configuring trade order parameters to submit to an electronic exchange. Specifically, based on the selection of a customer and a tradeable object, the trading system may dynamically populate an order entry window with trade order parameters that have been pre-configured. The trade order parameters include customer related parameters and order related parameters. These parameters may be pre-configured and stored in relation to a customer account thus decreasing the time necessary to enter specific trade order parameters at the desired time of trade order submission.

Before explaining any further, it is worth noting again that the various inventions are not limited in their application to the details of design and the arrangement of the components set forth in the following description or illustrated in the drawings. The inventions are capable of other embodiments or of being practiced or carried out in various ways.

I. Example Electronic Trading System

FIG. 1 is a block diagram that illustrates an example electronic trading system 100 upon which one or more embodiments may be implemented. Trading system 100 includes a trading device 102 and an electronic exchange 110. The system 100 may include additional, different, or fewer components. For example, as shown in FIG. 1, the system 100 may also include, among other things, a gateway device 106 and a server side device 114. According to the example trading system 100 of FIG. 1, trading device 102 is in communication with gateway 106 via network 104, and gateway 106 is in communication with electronic exchange 110 via network 108. Server side device 114 is in communication with gateway device 106 via network 112. Networks 104, 108, and 112 may be a part of the same network, may each include a different network, or some combination thereof. Further, networks 104, 108, and 112 may include, for example, any of a local area network ("LAN"), a wide area network ("WAN"), a virtual private network ("VPN"), Internet, an Internetwork, a wireless network, a combination of network types, and so on. It is understood that electronic trading system 100 may include additional trading devices, gateways, server side devices, and exchanges. Furthermore, additional networks may be used for communication. For example, the trading device 102 may be in communication with the server side device 114 via a network that is different than the network 104 or network 112.

By way of illustration, trading device 102 may include one or more electronic computing platforms such as a hand-held computer device, a laptop, a desktop computer, a workstation with a single or multi-core processor, a server with multiple processors, and/or a cluster of computers, for example. Trading device 102 may be used to trade one or more tradeable objects listed at electronic exchange 110.

A "tradeable object" refers to anything that can be traded with a price, a quantity, or both price and quantity. For example, financial products such as stocks, options, bonds, futures, currency, warrants, funds derivatives, commodities, and collections or combinations of these may be tradeable objects. A tradeable object may be "real" or "synthetic." A real tradeable object includes products that are listed by an exchange. A synthetic tradeable object includes products that are defined by the user and are not listed by an exchange. For example, a synthetic tradeable object may include a combination of real (or other synthetic) products such as a synthetic spread. A tradeable object may also include traded events or goods, for example.

Figure 2:
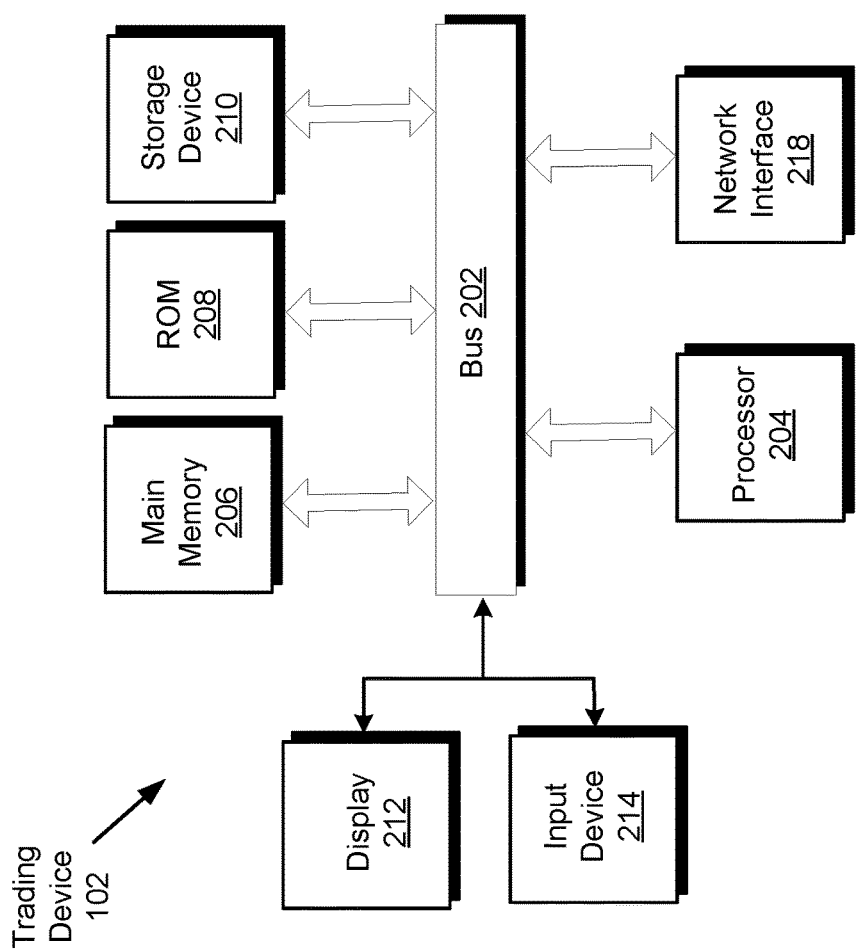
FIG. 2 is a block diagram that illustrates an example computer system upon which one or more embodiments may be implemented.

FIG. 2 is a block diagram that illustrates more detail of trading device 102 upon which an embodiment may be implemented. Trading device 102 includes a bus 202 or other communication mechanism for communicating information, and a processor 204 coupled with bus 202 for processing information. Trading device 102 also includes main memory 206, such as random access memory ("RAM") or other similar storage device, coupled to bus 202 for storing information and instructions to be executed by processor 204. Main memory 206 also may be used for storing variable or other intermediate information during execution of instructions to be executed by processor 204. Trading device 102 further includes a read only memory ("ROM") 208 or other similar storage device coupled to bus 202 for storing information and instructions for processor 104. A storage device 210, such as a magnetic disk or optical disk, may be provided and coupled to bus 202 for storing information and instructions.

Trading device 102 may include or be in communication with a display 212. For example, the processor 204 may be coupled via bus 202 to the display 212, such as a cathode ray tube ("CRT"), a liquid crystal display ("LCD"), a plasma display, a projector, or some other type of display, for displaying information to a user. An input device 214, including a keyboard, a mouse, a trackball, a combination thereof, or some other type of input device, is coupled to bus 202 for communicating selections to processor 204 and for controlling cursor movement on display 212.

According to an embodiment, configured trade order parameter information is provided by trading device 102 in response to processor 204 executing one or more sequences of one or more instructions contained in main memory 206. Such instructions may be read into main memory 206 from another computer-readable medium, such as ROM 208, storage device 210, or both. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to perform the steps described herein. Thus, the embodiments may not be limited to any specific combination of hardware circuitry and software.

The term "computer-readable medium" as used herein refers to any medium that participates in providing instructions to processor 204 for execution. Such a medium may take many forms, including, but not limited to, nonvolatile and volatile media. Nonvolatile media include, for example, optical or magnetic disks, such as storage device 210. Volatile media include dynamic memory, such as main memory 206. Common forms of computer-readable media include, for example, floppy disk, a flexible disk, hard disk, magnetic tape, any other magnetic medium, a CD-ROM, DVD, any other optical medium, a RAM, a PROM, an EPROM, a FLASHEPROM, any other memory chip or cartridge or any other medium from which a processor can read.

In addition, various forms of computer-readable media may be involved in providing one or more sequences of one or more instructions to processor 204 for execution. For example, the instructions may initially be on a remote computer. The remote computer can load the instructions into its memory and send the instructions over a network to trading device 102. Trading device 102 can receive the instructions and place it on bus 202. Bus 202 carries the data to main memory 206, from which processor 204 retrieves and executes the instructions. The instructions received by main memory 206 may optionally be stored at ROM 208 and/or on storage device 210 either before or after execution by processor 204.

Referring back to FIG. 1, gateway 106 may include one or more electronic computing platforms such as a hand-held device, laptop, desktop computer, workstation with a single or multi-core processor, server with multiple processors, and/or cluster of computers, for example. Gateway 106 may be configured to facilitate communication between trading device 102 and electronic exchange 110. For example, gateway 106 may receive market data from exchange 110 via network 108, translate it, and transmit the market data to trading device 102 via network 104. Similarly, gateway 106 may receive messages from trading device 102 via network 104, translate it, and transmit the messages to exchange 110 via network 108. Gateway 106 may also be configured to facilitate communication between server side device 114 and electronic exchange 110.

Server-side device 114 may include one or more electronic computing platforms such as a hand-held device, laptop, desktop computer, workstation with a single or multi-core processor, server with multiple processors, and/or cluster of computers, for example. Similar to trading device 102, server-side device 114 might be configured to perform trading functions. A possible advantage of using server-side device 114 is that data can be computed at a single location (or at a reduced number of locations) and then disseminated to a number of trading devices (only one of which is shown in FIG. 1). Another possible advantage of using server-side device 114 is it can be placed near or at exchange 110, which may result in reduced travel times for messages communicated between exchange 110 and server-side device 114 that are time sensitive (e.g., a trade order message). It is understood that aspects of the embodiments described here may be performed by server-side device 114 instead of at trading device 102, or in addition to trading device 102. That is, server-side device 114 may perform data processing and then disseminate that data to trading device 102 (and to other trading devices, if so desired). In addition, while FIG. 2 refers to trading device 102, it may also represent an embodiment of server-side device 114, for example. Server-side device 114 may also be configured to communicate with trading device 102.

Referring back to FIG. 1, electronic exchange 110 is configured to match trade orders to buy and sell tradeable objects. The tradeable objects may be listed for trading by exchange 110. The orders may include orders that originated from trading device 102 and/or server-side device 114, for example. Exchange 110 is also configured to provide market data to subscribing devices. Depending on the exchange and/or tradeable object traded, market data may include data that represents, among other things, any of the following: (1) the inside market, where the inside market is the lowest sell price and the highest buy price at a point in time; (2) quantities available at the inside market; (3) prices and quantities for orders that are away from the inside market; (4) last traded price ("LTP") and the last traded quantity ("LTQ"); (5) whether the LTQ is implied; and (6) order fill information.

In one or more embodiments, exchange 110 might refer to an internal matching system, where orders (of usually a smaller subset of traders) are matched internally. In one or more embodiments, exchange 110 might refer to an electronic communication network ("ECN").

While not shown for the sake of clarity, in certain embodiments, system 100 may include other devices that are specific to the communications architecture such as middleware, firewalls, hubs, switches, routers, exchange-specific communication equipment, modems, security managers, and/or encryption/decryption devices. Further, while FIG. 1 provides an overview of an example electronic trading system 100, it is understood that the embodiments described herein are not limited for use in the electronic trading system(s) described herein, but rather may be used in any type of electronic trading system where certain data described below is available.

II. Configuring Trade Order Parameters

The example embodiments provide a trader or broker a powerful way to pre-configure trade order parameters, allowing for a more efficient and effective way to submit a trade order to an electronic exchange. According to an example embodiment, based on the selection of a customer and a tradeable object, the trading system will dynamically populate an order entry window with trade order parameters that have been pre-configured. Rather than manually configuring each individual parameter of a trade order, the customer and order parameters may be pre-configured and stored in relation to a customer account. Pre-configuring and storing these parameters allows the trader/broker flexibility to easily and quickly enter and submit trade orders for multiple traders without having the risk of, for example, mistyping or forgetting to enter trade order data. Selecting both a customer and a tradeable object eliminates the need for the trader/broker to enter any order type parameters at the time of order submission. Further, if a trader only selected a customer, for example, the order template, and other trade order parameters would need to be manually entered in an order entry window.

As discussed, a trader or broker may pre-configure trade order parameters such as customer parameters and order parameters. Customer parameters are used to configure information related an individual customer or trader. For example, customer parameters may include but are not limited to, customer, tradeable object, gateway, market, product type, account #, account type, give up, free form text fields, user tags, and order template. When a specific customer and tradeable object are selected, the trading system may evaluate the different customer options, determine the best match based on the selection, and the pre-configured customer parameters will be dynamically populated in the order entry window.

Order parameters are used to configure information about a specific order type, for example, Iceberg, Stop Limit, or Trailing Stop orders, however it should be understood that there are many different order types that may be configured.

Similarly, it should be understood that a trader may also define synthetic trade orders as well. Order parameters may include but are not limited to, order template, tradeable object, gateway, market, product type, price mode, price mode type, price mode ticks, modifier, trigger price type, trigger price quantity, qualifier, ticks away, advanced, disclosed quantity, and order tags. As with customer parameters, when a specific customer and tradeable object are selected, the trading system will evaluate and determine the best customer match. After finding the best customer match the trading system will evaluate and determine the best order type match. The pre-configured order type parameters associated with the best match may be dynamically populated in the order entry window, at which time the order type parameters are associated with a specific trade order.

FIG. 3 is a diagram that illustrates an example embodiment. Specifically, FIG. 3 is a graphical display that a trader/broker may use to configure one or more customers and associated customer parameters. Customer Defaults Window 300 includes but is not limited to the following customer parameters: Customer 302, Product 304, Gateway 306, Market 308, Product Type 310, Account # 312, Account Type 314, Give Up 316, FFT2 (Free Form Text 2) 318, FFT3 (Free Form Text 3) 320, User Tag 322, and Order Template 324.

Customer 302 may be used to define parameters to associate with one or more traders, for example "TRADER1," "TRADER2." Product 304 may be used to define a specific tradeable object that a trader may be trading. Gateway 306 may be used to define a specific gateway in which a trader is connected. Market 308 may be used to define a specific market (electronic exchange) in which a trader is subscribed, for example, "CME," "CBOT," "LIFFE." Product Type 310 may be used to define what type of product the tradeable object may be, for example, spread, future, or option, and so on. And Order Template 324 may be used to define the order type associated with the trader. As shown in FIG. 3, multiple traders of the same name can be defined with different customer parameters. The remaining customer parameters 312-322 in the Customer Default window 300 may be used to further pre-configured information that may be dynamically populated in the Order Entry window based on the selection of a customer and a tradeable object.

FIG. 3 illustrates that two customers have been configured in the Customer Defaults Window 300, "TRADER1" and "TRADER2." It should be understood that any number of traders could be pre-configured in the Customer Defaults Window 300 depending on how many traders a broker is managing, for example. Also, as shown in FIG. 3, multiple traders of the same name with different customer parameters can be pre-configured to increase the configuration options for each trader. If an individual trader is pre-configuring the Customer Defaults Window 300, rather than a broker, the trader may configure a "<Default>" trader without any additional traders. Similarly, an individual trader may configure multiple traders in the Customer Defaults Window 300.

As shown in FIG. 3, there are two of "TRADER1" and two of "TRADER2," each with different account information depending on the market that is being traded. The first "TRADER1," at row 2 in the Customer Defaults Window 300, has been configured with "*" for the customer parameters 304-310. Further, the first "TRADER1" has a pre-configured Account # 312 of "abcd" and an Order Template 324 of "ICEBERG." The "*" is a "wild card," and when the "*" is used as a parameter it represents that any Product 304, Gateway 306, Market 308, or Product Type 310 maybe be matched and is not limited to any one option.

Similarly, the second "TRADER1" has been configured with a "*" for the customer parameters Product 304, Gateway 306, and Product Type 310. However, the customer parameter Market 308 has been pre-configured as "CME." Further, the second "TRADER1" has a pre-configured Account # 312 of "1234" and an Order Template 324 of "STOP LIMIT." According to the example embodiment, if the trader/broker selects "TRADER1" and a tradeable object that is traded on the "CME" market in the order entry window, then the trading system evaluates the data in the Customer Defaults Window 300 and determines that the associated Account # is "1234." Additionally, the trading system determines that the order template associated with second "TRADER1," when the selected tradeable object is traded on the "CME" market, is "STOP LIMIT." To determine more details regarding the configured "STOP LIMIT" order template, the trading system refers to the Order Defaults Window 400 as shown in FIG. 4.

FIG. 4 is a diagram illustrating the Order Defaults Window 400 used to configure one or more trade order parameters. Specifically, FIG. 4 is a graphical display that a trader/broker would use to configure one or more orders types and associated order parameters. Order Defaults Window 400 which includes, but is not limited to the following order type parameters: Template 402, Product 404, Gateway 406, Market 408, Product Type 410, Price Mode 412, Price Mode Type 414, Price Mode Ticks 416, Modifier 418, Trigger Price Type 420, Trigger Price Qty 422, Qualifier 424, Ticks Away 426, Advanced 428, Disclosed Qty 430, and Order Tag 432.

Template 402 may be used to define specific order types, for example, "STOP LIMIT," "ICEBERG," and so on. It should be understood that once an order type (Template 402) is defined in Order Defaults window 400, that order template is available in Customer Defaults window 300 as an option to associate with a specific customer 302. As described in reference to FIG. 3. Product 404 may be used to define a specific tradeable object that a trader may be trading. Gateway 406 may be used to define a specific gateway in which a trader is connected. Market 408 may be used to define a specific market (electronic exchange) in which a tradeable object is traded on and in which the trader subscribed, for example, "CME," "CBOT," "LIFFE." Product Type 410 may be used to define what type of product the tradeable object may be, for example, spread, future, or option. It should be understood that the tradeable object comprises information associated with both the customer and order parameters: Product, Gateway, Market, and Product type. As such, when a tradeable object is selected the trading system may discern which Product, Gateway, Market, and Product type the tradeable object is associated with, without having to select each parameter individually.

As shown in FIG. 4, multiple order types of the same name can be pre-configured with different order type parameters. The remaining order parameters 412-432 in the Order Default window 400 may be used to further pre-configure specific order information that may be dynamically populated in the Order Entry window based on the selection of a customer and a tradeable object.

According to FIG. 4, two different example order types have been configured, each with two different sets of configuration parameters. Specifically, two "STOP LIMIT" order templates have been configured and two "ICEBERG" order templates have been configured. The first "STOP LIMIT", at row 2 in Order Default Window 400, has been configured with a "*" for the order type parameters 404-410. Similarly, the second "STOP LIMIT," at row 3, has been configured with a "*" at 404, 406, and 410 except for the Market 408 field, where "CBOT" has been pre-configured. As shown in FIG. 4, each of the "STOP LIMIT" order templates has specific order type parameters pre-configured such as Price Mode 412, Price Mode Type 414, Price Mode Ticks 416, Modifier 418, Trigger Price Type 420, and Trigger Price Qty 422. As shown in FIG. 4, the two "ICEBERG" order templates, at rows 4 and 5, also have specific order type parameter configured in Order Defaults Window 400. Based on the selection of a customer and tradeable object in the order entry window, the pre-configured order type parameters associated with the best match is populated in the order entry window.

Figure 5:
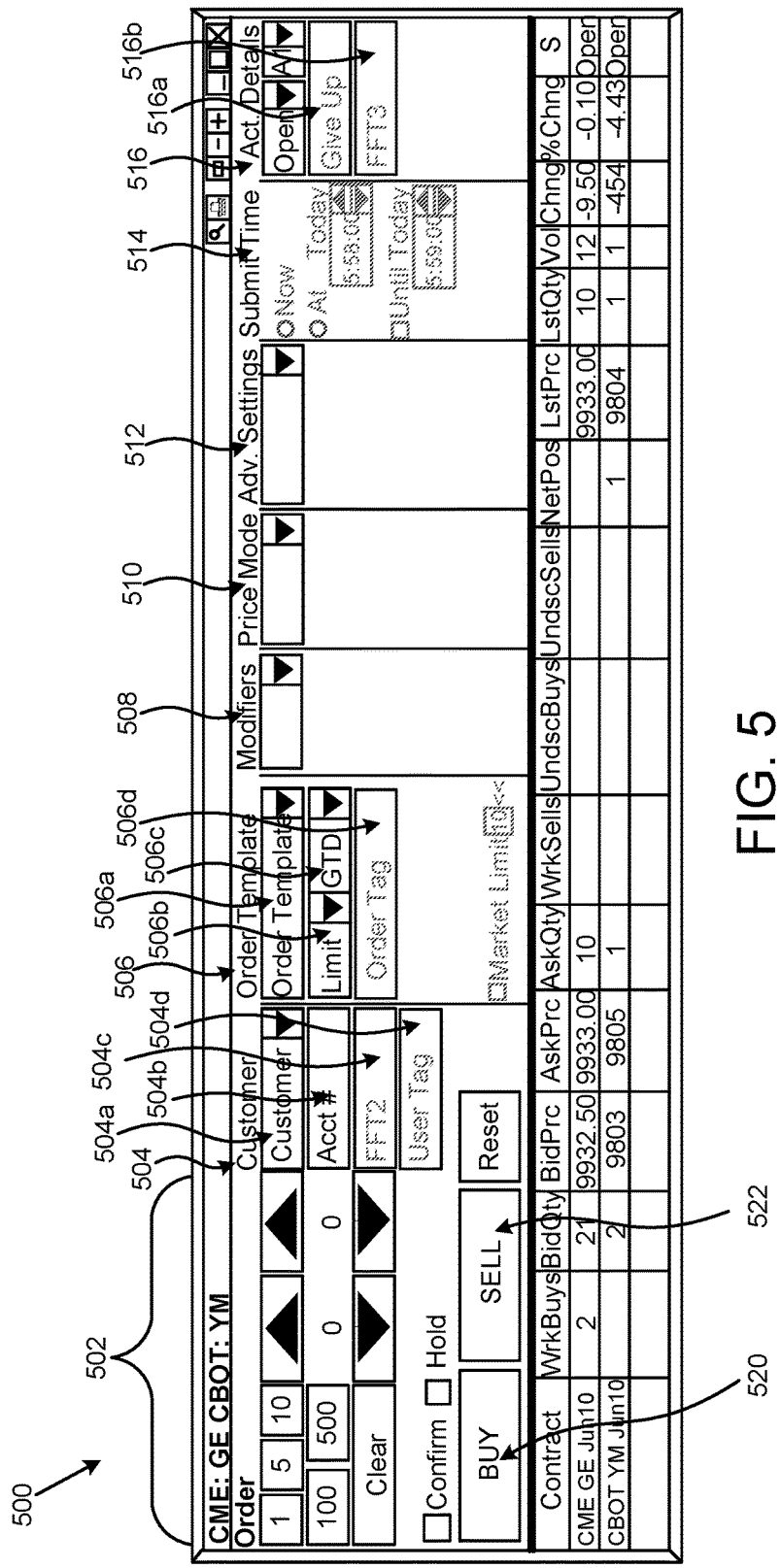
FIG. 5 is a diagram that illustrates one or more example embodiments being implemented.

FIG. 5 is a diagram illustrating an order entry window that may be used in association with the example embodiments shown in FIGS. 3 and 4. Specifically, FIG. 5 is a graphical display of an order entry window that a trader/broker would use to enter trade order parameters and submit the trade order to an electronic exchange. A commercial embodiment of an order entry window is X_TRADER® which is offered by Trading Technologies International. The upper pane of Order Entry window 500 includes order quantity configuration buttons 502, Customer parameters 504-504d, Order Template parameters 506-506d, Modifiers 508, Price Mode 510, Advanced Settings 512, Submit Time 514, Account Details parameters 516-516b, Buy Indicator 520, and Sell Indicator 522. Buy/Sell indicators 520, 522, may be selected to submit a trade order to the electronic exchange with the dynamically populated trade order parameters.

The lower pane of Order Entry window 500 includes current market information associated with the tradeable objects being traded by the trader/broker. For example, the current inside market for the tradeable object "CME GE Jun10" has a best bid price of "9932.50" and a best ask price of "9933.00." Further, from the selection of tradeable object "CME GE Jun10" the trading system discerns that the Product 304 is "GE," the Gateway 306 is "CME," the Market 308 is "CME," and the Product Type 310 is "Future." Similarly, the current inside market for the tradeable object "CBOT YM Jun10" has a best bid price of "9803" and a best ask price of "9805." Further, from the selection of tradeable object "CBOT YM Jun10" the trading system discerns that the Product 304 is "YM," the Gateway 306 is "CBOT," the Market 308 is "CBOT," and the Product Type 310 is "Future." As previously discussed, current market information is received from the electronic exchange.

III. Dynamically Populating Trade Order Parameters

Figure 6:
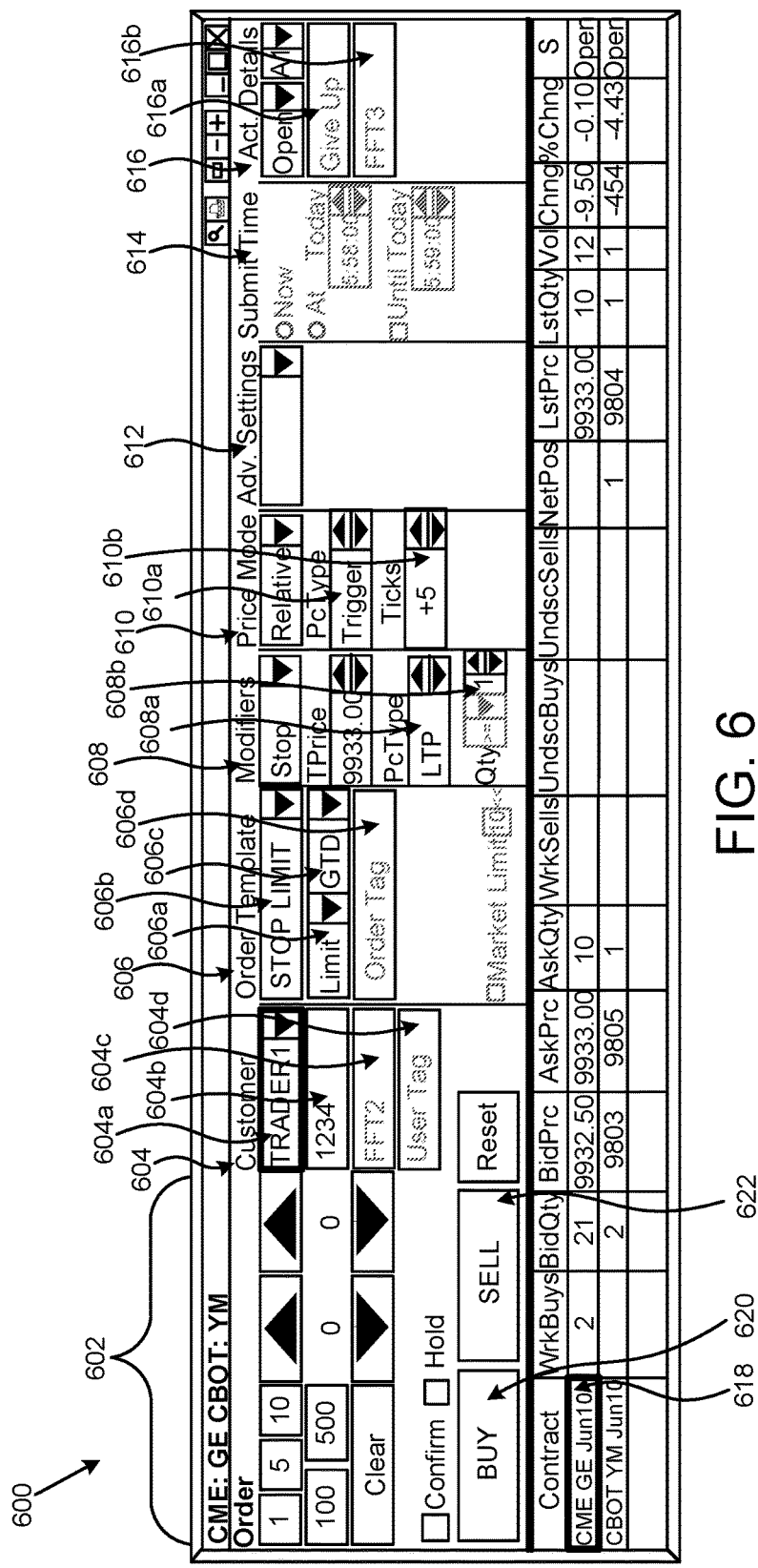
FIG. 6 is a diagram that illustrates an example embodiment of selecting a customer and a tradeable object to dynamically populate trade order parameters in an order entry window.

FIG. 6 is a diagram illustrating an example embodiment of selecting a customer and a tradeable object to dynamically populate trade order parameters in an order entry window. FIG. 6 includes a similar graphical display and characteristics as shown in FIG. 5. As previously described, to dynamically populate the trade order parameters in the order entry window 600, the trader selects a customer and a tradeable object. For example, as shown in FIG. 6, a broker (or some other user) selects customer 604a "TRADER1" and tradeable object 618 "CME GE Jun10."

After selecting a customer and tradeable object, the trading system evaluates and determines the best match for the given selection, "TRADER1" and "CME GE Jun10." Determining the best match is based on a weight and precedence that are assigned to one or more customer and order type parameters, where the parameter with the highest precedence is given the highest weight. Matching goes in order of precedence, for example, as shown in FIG. 3.: Customer 302, tradeable object (or Product) 304, Gateway 306, Market 308, and Product Type 310, with Customer 302 having the highest precedence. Generally, there are multiple matching possibilities: exact match, wild card match, and no match. For example, an exact match means that the selected parameter exactly matches a configured parameter in the Customer Defaults 300 or Order Defaults 400 windows. A wild card ("*") match means that any parameter may be selected by the trader. No match means that the selected parameter does not match the configured parameter and that the trading system does not evaluate the entry.

As discussed, a trader/broker can assign a weight to one or more customer/order type parameters for matching purposes. For example, Customer 302 may be assigned a weight of "16," Product 304 a weight of "8," Gateway 306 a weight of "4," Market 308 a weight of "2," and Product Type 310 a weight of "1." It should be understood that the weight could be for example, any value, percentage, or result of an equation, etc. For the given entry in Customer Defaults window 300, the trading system first attempts to match the parameter with the highest precedence, in this example, Customer 302. If the trading system determines there is an exact match, then the weight of that parameter is added to a current match total for the given entry. If the parameter supports a wild card and is defined as "*", then no value is added to the current match total. If the trading system determines that there is no match, then processing continues to the next entry in the Customer Defaults window 300 or Order Defaults window 400. Entries that contain no match are not considered for the best matching entry. The trading system then moves to the parameter with the next highest precedence level, in this case Product 304. The trading system will continue on through the defined customer parameters 302-310 and order type parameters 402-410 shown in FIG. 4. If the current match total exceeds the best match total, the current entry is considered the best match by the trading system. The process continues until all entries have been processed. Once the best match is determined by the trading system, the pre-configured order parameters may be dynamically populated in the Order Entry window 500.

According to an example embodiment, the trading system refers to the Customer Defaults window 300 to first find the best match for the selected Customer "TRADER1" and tradeable object "CME GE Jun10". Referring back to FIG. 3, there are two entries that could match the selected customer, as seen at rows 2 and 3 of Customer Defaults window 300. After evaluating the Customer Defaults Window 300, the trading system determines that the second "TRADER1," at row 3, is the best match. Specifically, the second "TRADER1" is the best match because there is an exact match for Market 308 ("CME"), where in the first "TRADER1" all of the pre-configure customer parameters are a "*" (wild card).

In another example embodiment, assume the market in the first TRADER1 were pre-configured instead for the "LIFFE" market (vs. "*"). Also assume that the trader selects a tradeable object traded on an market other than "LIFFE" or "CME," for example "CBOT." In this instance, the trading system would not match either row 2 or 3. When there is no match, the trading system will default to the customer at the first row defined in Customer Defaults Window 300 as the best match.

The second "TRADER1," at row 3 in FIG. 3, has been pre-configured with an Order Template 324 of "STOP LIMIT." Based on the Order Template 324, the trading system then refers to the Order Defaults Window 400, to evaluate the pre-configured order type parameters associated with "STOP LIMIT."

Referring to FIG. 4, there are two entries that could match the Order Template 324, as seen at rows 2 and 3 of the Order Defaults Window 400. After evaluating the Order Defaults Window 400, the trading system determines that the first "STOP LIMIT" at row 2, is the best match. Specifically, the first "STOP LIMIT" is the best match because the Market 408 ("CBOT") associated with the second "STOP LIMIT" does not match and is therefore is not considered.

As such, once a best match is determined (first "TRADER1" and second "STOP LIMIT") the customer parameters and the order parameters are dynamically populated in the Order Entry Window 600. Specially, FIG. 6 dynamically populates the pre-configured order parameters associated with the best match determined by the trading system: Account #604*b* as "1234", Order Template 606*b* as "STOP LIMIT," Price Type 608*a* as "LTP,", Quantity 608*b* as "1," Price Mode 610 as "Relative," Price Type 610*a* as "Trigger," and Ticks 610*b* as "+5."

According to the example embodiments, once the customer and order parameters have been dynamically populated in the Order Entry window 600, the trader/broker may simply submit the trade order by selecting either the Buy Indicator 620 or the Sell Indicator 622.

IV. Selecting a Different Tradeable Object

Figure 7:
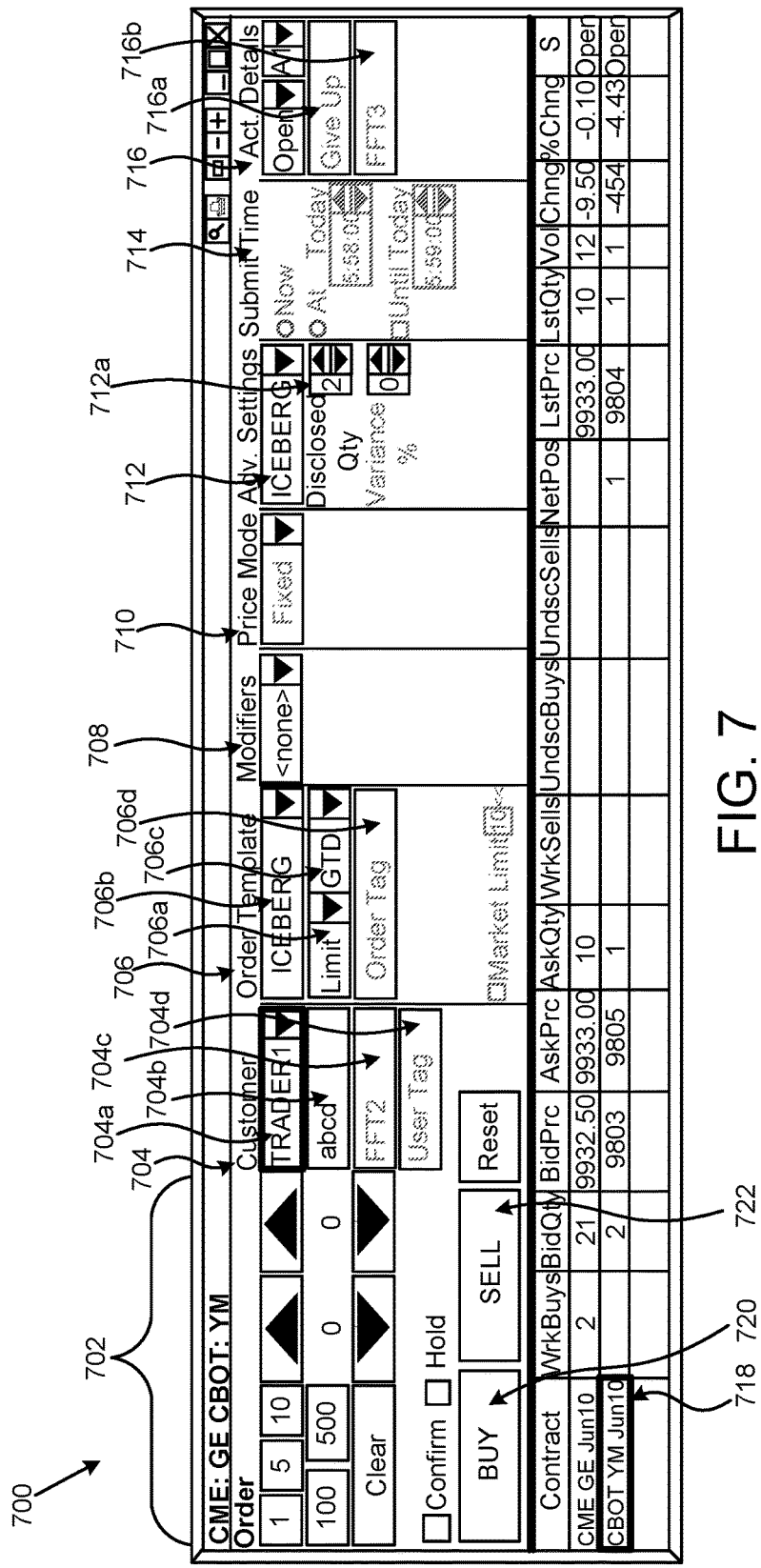
FIG. 7 is a diagram that illustrates an example embodiment of selecting a customer and a tradeable object to dynamically populate trade order parameters in an order entry window.

FIG. 7 is a diagram that illustrates one or more example embodiments of selecting a customer and a tradeable object to dynamically populate trade order parameters in an order entry window. FIG. 7 includes the same graphical display and characteristics as shown in FIG. 6. As previously described, to dynamically populate the trade order parameters in the order entry window 700, the trader selects a customer and a tradeable object. For example, as shown in FIG. 7, the trader selects customer 704*a* "TRADER1" and tradable object 718 "CBOT YM Jun10."

As in the previous example, after selecting a customer and tradeable object, the trading system evaluates and determines the best match for the given selection. In this instance, the trader selects the same Customer option of "TRADER1" but selected a different tradeable object "CBOT YM Jun10." According to the example embodiments, the trading system references the Customer Defaults window 300 to find the best match for the selected Customer "TRADER1" and tradeable object "CBOT YM Jun10." Referring back to FIG. 3, there are two entries that could match the selected customer, as seen at rows 2 and 3 of Customer Defaults window 300. After evaluating the Customer Defaults Window 300, the trading system determines that the first "TRADER1" at row 2 is the best match. Specifically, the first "TRADER1" is the best match because Market 308 "CME" associated with the second "TRADER1" does not match and is therefore is not considered by the trading system.

The first "TRADER1," at row 2 in FIG. 3, has been pre-configured with an Order Template 324 of "ICEBERG." Based on the Order Template 324, the trading system then refers to the Order Defaults Window 400, to evaluate the pre-configured order type parameters associated with "ICEBERG."

Referring to FIG. 4, there are two entries that could match the Order Template 324, as seen at rows 4 and 5 of the Order Defaults Window 400. After evaluating the Order Defaults Window 400, the trading system determines that the second "ICEBERG" at row 5, is the best match. Specifically, the second "ICEBERG" is the best match because the Market 408 ("CBOT") associated with the second "ICEBERG" is an exact match.

As such, once a best match is determined, the pre-configured customer parameters and the order type parameters are dynamically populated in the Order Entry Window 700. Specifically, FIG. 7 dynamically populates the pre-configured order type parameters associated with the best match determined by the trading system: Account #704*b* as "abcd", Order Template 706*b* as "ICEBERG," Price Mode 710 as "Fixed," Advanced Settings 712 as "ICEBERG," and Disclosed Qty 712*a* as "2."

Once the customer and order parameters have been dynamically populated in the Order Entry window 700, the trader/broker may submit the trade order by selecting either the Buy button 720 or the Sell button 722.

V. Pre-Configuring Different Customer and Order Parameters

FIG. 8 is a diagram that illustrates a Customer Defaults window 800 (similar to 300), as shown in FIG. 3, in which a trader/broker can pre-configure parameters associated with one or more customers. As shown in FIG. 8, the trader/broker has only configured a "<Default>" trader, such that the account information associated with the "<Default>" will be associated with each selection of a customer and tradeable object.

FIG. 8 illustrates that one customer has been configured in the Customer Defaults Window 300, "<Default>." The customer "<Default>" at row 1 in the Customer Defaults Window 300, has been configured with "*" for the customer parameters 804-810. Further, the "<Default>" customer has a defined Account # 812 of "1234," FFT2 818 of "Tdr1", User 822 Tag of "John", and an Order Template 824 of "ICEBERG."

In another example embodiment, a trader or broker may pre-configure parameters that allow for internal messaging, where the messages are not sent to an electronic exchange and are only used for internal purposes. For example, as shown in FIG. 3 and FIG. 4, User Tag 322 and Order Tag 432 are parameters that allow a trader/broker to pre-configure internal messaging. Internal messaging gives traders/brokers further flexibility to define, organize, and analyze the multiple traders and/or orders being managed. Further, internal messages allow the trader/broker to record, for example, confidential information associated with an order that should not be shared or submitted to an electronic exchange.

Similarly, a trader or broker may pre-configure parameters that allow for external messaging, where the messages are sent to an electronic exchange. For example, as shown in FIG. 3, FFT2 318 and FFT3 320 are parameters that allow for a trader/broker to pre-configure an external message.

As shown in FIG. 8, the trader has pre-configured the FFT2 818 parameter as "Tdr1." FFT2 818 is a parameter that provides for external messaging to the electronic exchange. Some electronic exchanges require this parameter to be sent, others do not, it depends on the requirements determined by the electronic exchange. Electronic exchanges may use FFT2 parameter, as well as FFT3, for organizational or sorting purposes. Similarly, as shown in FIG. 8, the trader has pre-configured the User Tag 822 parameter as "John." Unlike FFT2 818 and FFT3 820, User Tag 822 is used for internal messaging. User Tag 822 is not passed to the electronic exchange but instead allows for internal messages that the trader can use for example, personal organization, sorting, tracking, or analyzing purposes.

In the instance that a broker is pre-configuring Customer Defaults 800 for multiple traders, using internal messaging User Tag 822 may prove to be useful for keeping track of different orders submitted for each of the multiple traders. The broker could for example, easily organize or sort orders based on the User Tag 822.

Figure 9:
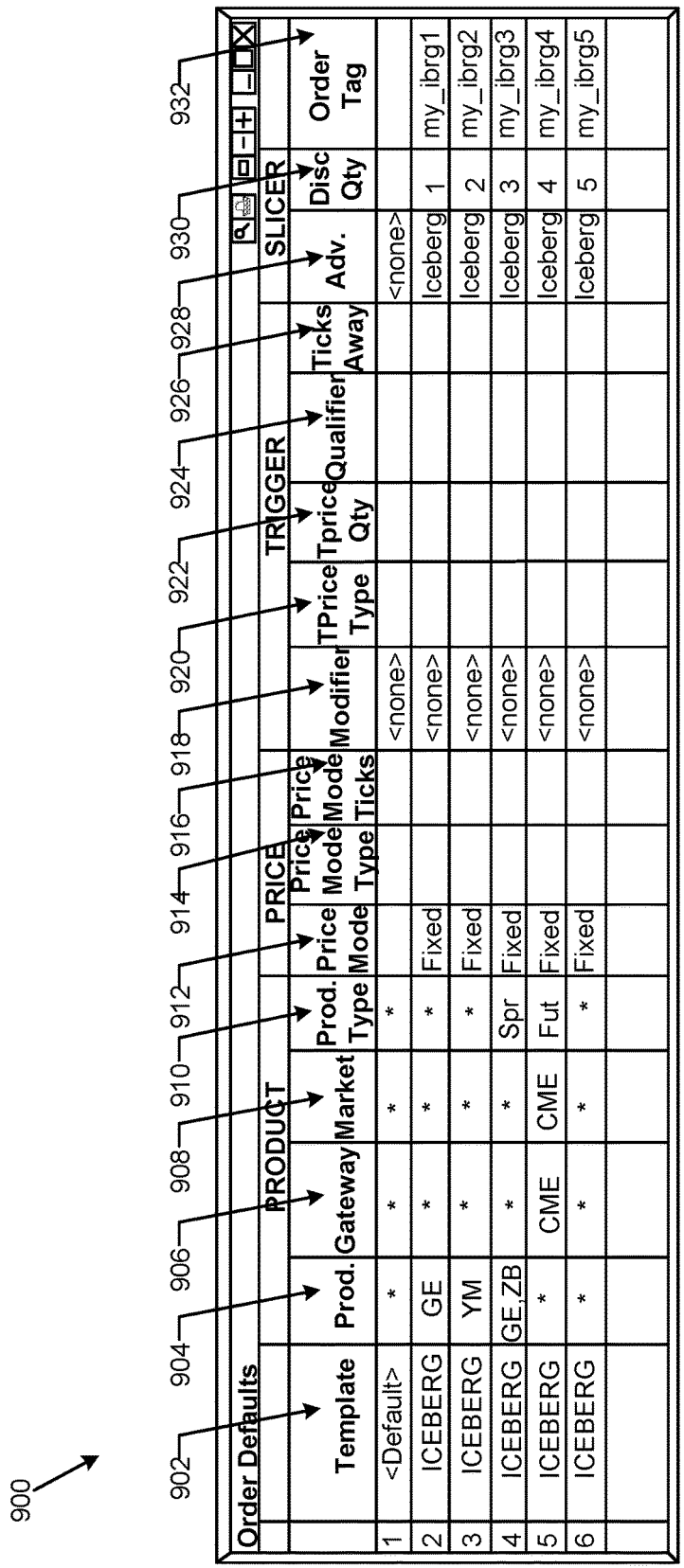
FIG. 9 is a diagram that illustrates an example graphical display used to configure order related parameters.

FIG. 9 is a diagram illustrating an Order Defaults Window 900 (similar to 400) used to configure one or more trade order parameters. Order Defaults Window 900 includes the following order type parameters: Template 902, Product 904, Gateway 906, Market 908, Product Type 910, Price Mode 912, Price Mode Type 914, Price Mode Ticks 916, Modifier 918, Trigger Price Type 920, Trigger Price Qty 922, Qualifier 924, Ticks Away 926, Advanced 928, Disclosed Qty 930, and Order Tag 932.

According to FIG. 9, one order type "ICEBERG" has been configured, with five different sets of order type parameters. Specifically, the first "ICEBERG" order type has an Order Tag 932 as "my_ibrg1." Similar, but not exact, configurations have been defined for each of the "ICEBERG" order types. Order Tag 932 is used for internal messaging. Order Tag 932 is not passed to the electronic exchange, but instead allows for internal messages that the trader can use for example, personal organization, sorting, tracking, or analyzing purposes.

Figure 10:
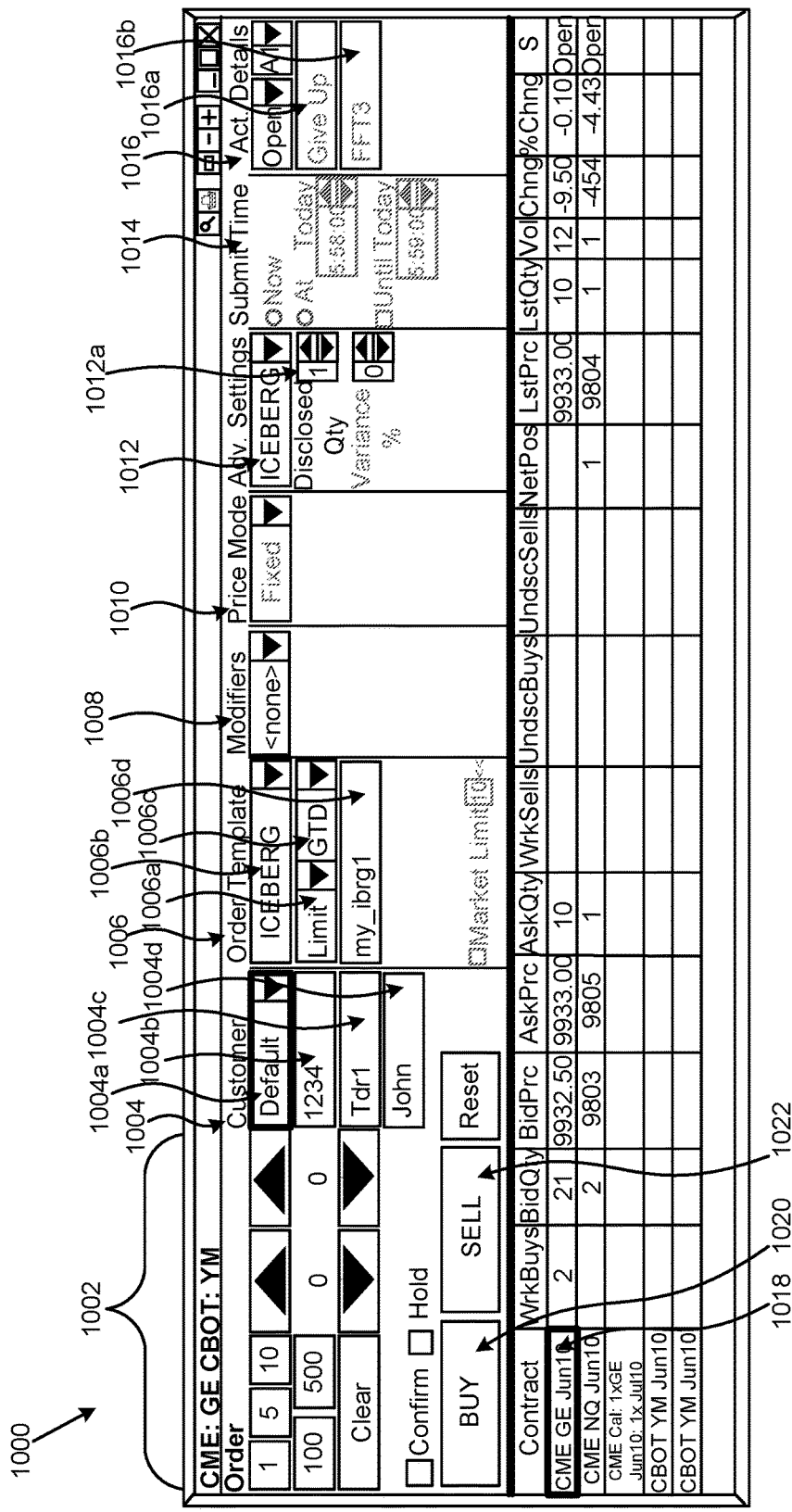
FIG. 10 is a diagram that illustrates an example embodiment of selecting a customer and a tradeable object to dynamically populate trade order parameters in an order entry window.

FIG. 10 is a diagram illustrating an example embodiment of selecting a customer and a tradeable object to dynamically populate trade order parameters in an order entry window. FIG. 10 includes the same graphical display and characteristics as shown in FIG. 7. As previously described, to dynamically populate the trade order parameters in the order entry window 1000, the trader selects a customer and a tradeable object. For example, as shown in FIG. 10, a trader selects customer 1004a "<Default>" and tradeable object 1018 "CME GE Jun10."

As in the previous examples, after selecting a customer and tradeable object, the trading system evaluates and determines the best match for the given selection. In this instance, the trader selects the same Customer option of "Default" and tradeable object "CME GE Jun10." According to the example embodiments, the trading system refers the Customer Defaults window 800 to find the best match for the selected Customer "<Default>" and tradeable object "CME GE Jun10." Referring back to FIG. 8, "<Default>" has been configured with "*" for each of the customer parameters 802-810. Thus, "<Default>" customer will be the best match for any order the trader submits via the Order Entry window.

The "<Default>" customer at row 1 in FIG. 8, has been pre-configured with an Order Template 824 of "ICEBERG." Based on the Order Template 824, the trading system then refers to the Order Defaults Window 900, to evaluate the pre-configured order type parameters associated with "ICEBERG."

Referring to FIG. 9, there are three entries that could match the Order Template 824, as seen at rows 2, 5, and 6 of the Order Defaults Window 900. After evaluating the Order Defaults Window 900, the trading system determines that the first "ICEBERG" at row 2, is the best match. Although the fourth "ICEBERG" at row 5 exactly matches Gateway 906, Market, 908, and Product Type, the first "ICEBERG" is the best match because it exactly matches Product 904 and Product 904 has a higher precedence than the other order type parameters.

As such, once a best match is determined, the pre-configured customer parameters and the order parameters are dynamically populated in the Order Entry Window 1000. Specifically, FIG. 10 dynamically populates the pre-configured order parameters associated with the best match determined by the trading system: Account #1004b as "1234", FFT2 1004c as "Tdr1," User Tag 1004d as "John," Order Template 1006b as "ICEBERG," Order Tag 1006d as "my_ibrg1," Price Mode 1010 as "Fixed," Advanced Settings 1012 as "ICEBERG," and Disclosed Qty 1012a as "1."

Once the customer and order parameters have been dynamically populated in the Order Entry window 1000, the trader selects either Buy button 1020 or the Sell button 1022 to submit a trade order to the electronic exchange.

One or more of the steps of the method discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

While the inventions have been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from the spirit or scope of the present inventions. Therefore, it is intended that the inventions not be limited to the particular embodiments disclosed herein.

What is claimed is:

1. A method for configuring trade order parameters comprising:

storing, via a computing device, a plurality of sets of customer parameters received via the computing device from a user of the computing device, each set of customer parameters being associated with one of a plurality of customers, identifying information for the associated one of a plurality of customers, and including a parameter for the associated one of a plurality of customers and a parameter for a tradeable object;

storing, via computing device, a plurality of sets of order parameters, each set of order parameters identifying information for an order type and including a parameter for a customer associated with the set of order parameters and a parameter for a tradeable object, where the customer associated with the set of order parameters is one of the plurality of customers;

receiving, via a graphical interface of the computing device, a first user command to select a customer of the plurality of customers and one a plurality of tradeable objects;

in response to receiving the first user command, evaluating, via the computing device, the plurality of sets of customer parameters, the plurality of sets of order parameters, the selected customer and the selected one of the plurality of tradeable objects to determine a best customer match of the plurality of sets of customer parameters, where the best customer match is determined according to a weight and precedence assigned to at least one customer parameter of each set of the plurality of sets of customer parameters and to at least one order parameter of each set of the plurality of sets of order parameters;

in response to determining the best customer match, evaluating, via the computing device, the plurality of sets of customer parameters, the plurality of sets of order parameters, the selected customer and the selected one of the plurality of tradeable objects to determine a best trade order match of the plurality of sets of order parameters based on the selected customer and one of the plurality of tradeable objects and the best customer match of the plurality of sets of customer parameters, in response to determining the best customer match and the best trade order match, activating, via the computing device, an order entry window application to display via the graphical interface an interactive order entry window for the user of the computing device to provide customer parameters and order parameters to the computing device for an order to be submitted to an electronic exchange;

populating, via the computing device, the order entry window with the customer parameters associated with the best customer match and order parameters associated with the best trade order match;

receiving, via the graphical interface of the computing device, a second user command to send a trade order to an electronic exchange, the trade order having the order parameters; and in response to receiving the second user command, sending the trade order to the electronic exchange.

2. The method of claim 1 where determining a best customer match comprises determining a first set of parameters.

3. The method of claim 2 where the selected one of the plurality of tradeable objects comprises a contract name having information associated with a market parameter and a product parameter.

4. The method of claim 3 where the first set of parameters comprises any of the market parameter and the product parameter.

5. The method of claim 4 where determining the best trade order match further comprises comparing the information associated with the market parameter and the product parameter to the first set of parameters to determine a second set of parameters.

6. The method of claim 5 where the order entry window is populated based on the first set of parameters and the second set of parameters.

7. The method of claim 1, further comprising:
applying, via the computing device, a weight to at least one parameter of at least one set of the plurality of sets of customer parameters and the plurality of sets of order parameters; and determining the best customer match and the best trade order match according to the weight.

* * * * *